March 10, 1964 G. L. GOUGH 3,124,018
POSITIONING TABLE

Filed July 7, 1961 2 Sheets-Sheet 1

INVENTOR
George L. Gough

INVENTOR
George L. Gough

United States Patent Office 3,124,018
Patented Mar. 10, 1964

3,124,018
POSITIONING TABLE
George L. Gough, 3955 W. Lake Ave., Glenview, Ill.
Filed July 7, 1961, Ser. No. 122,501
9 Claims. (Cl. 77—63)

This invention relates to a positioning table that is selectively movable from any one to a plurality of positions relative to a fixed tool or point on a machine. More particularly, this invention relates to a positioning table that is capable of being mounted on the usual work table of a machine tool and is independently positionable on the base of that machine by its own drive means in both of the co-ordinate directions.

An object of the invention is to provide a positioning table that is simple and inexpensive in construction and operation and in which precise movement can be obtained.

An object of the invention is to provide a more compact table having fewer parts that is readily mountable upon the work tables of existing machines.

An object of the invention is to eliminate the usual separate frame structure to which is clamped one of the co-ordinate motors.

An object of the invention is to provide a positioning table wherein both of the motors for the co-ordinate movements are mounted on the same frame member.

Another object of the invention is to provide a table that is readily assembled and disassembled.

Another object of the invention is to reduce the amount of machining and trueing of the guide surfaces for the table.

Another object of the invention is to provide a three unit positioning table wherein the middle unit is hollow allowing the introduction therein of the portions of the other units thereby reducing the over-all height of the table.

The invention features reversable X axis and Y axis motors mounted on the same positioning structure, which itself is movable.

Another object of the invention is to guide the positioning table by spaced guide blocks having machined therein guide surfaces guiding the positioning table in directions parallel to the X and Y co-ordinates.

Other features and advantages of the invention will become apparent from the following detailed description when considered in conjunction with the accompanying drawing wherein.

Figure 1:
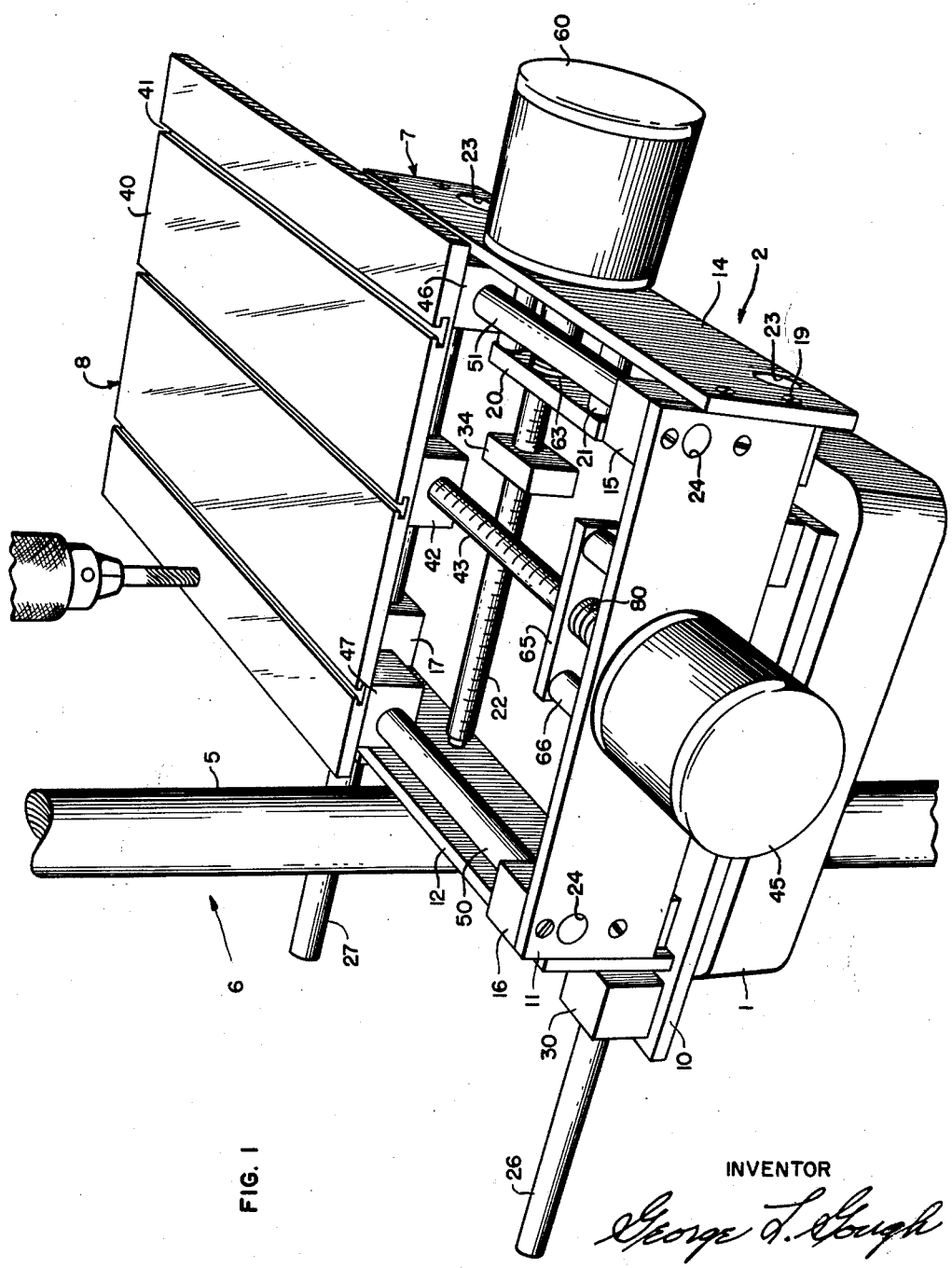
FIG. 1 is a perspective view of the positioning table according to the present invention.
Figure 2:
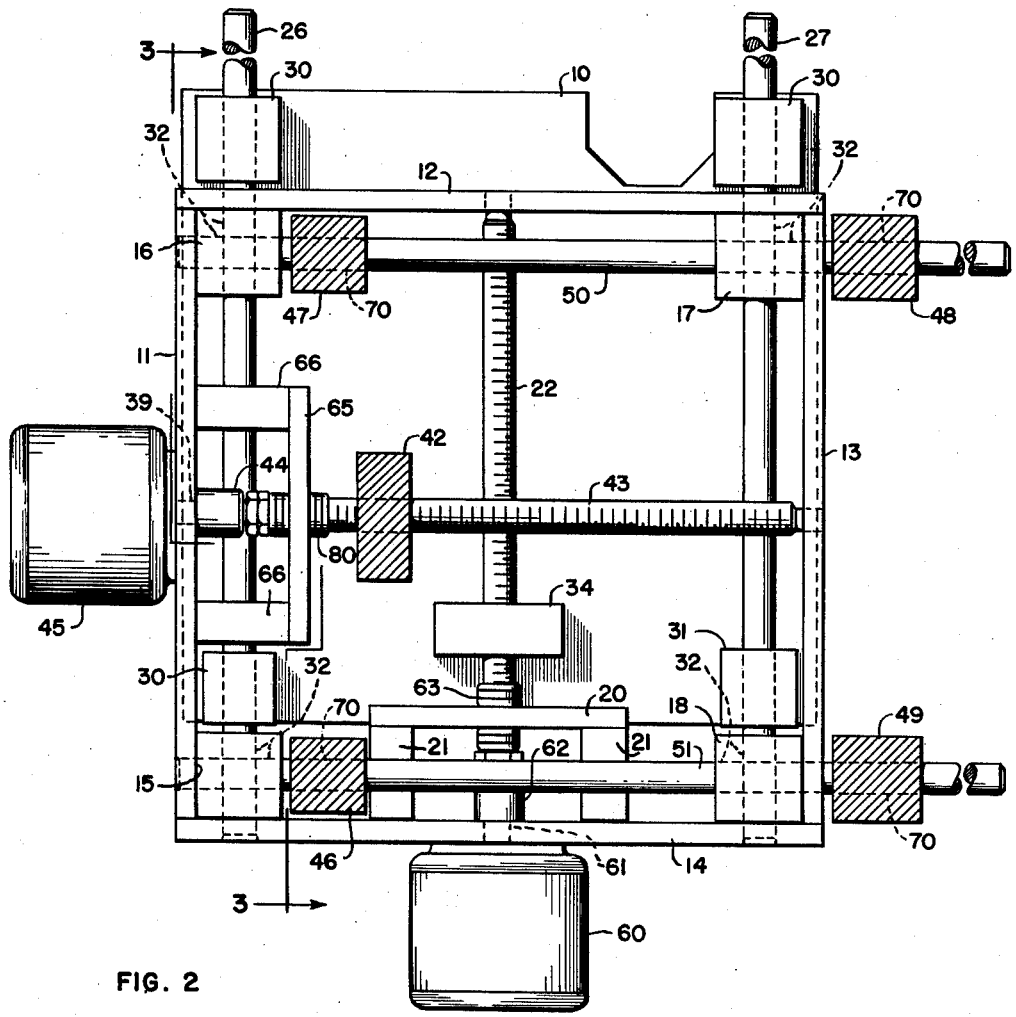
FIG. 2 is a plan view of the positioning table according to the present invention mounted on a conventional machine tool.
Figure 3:
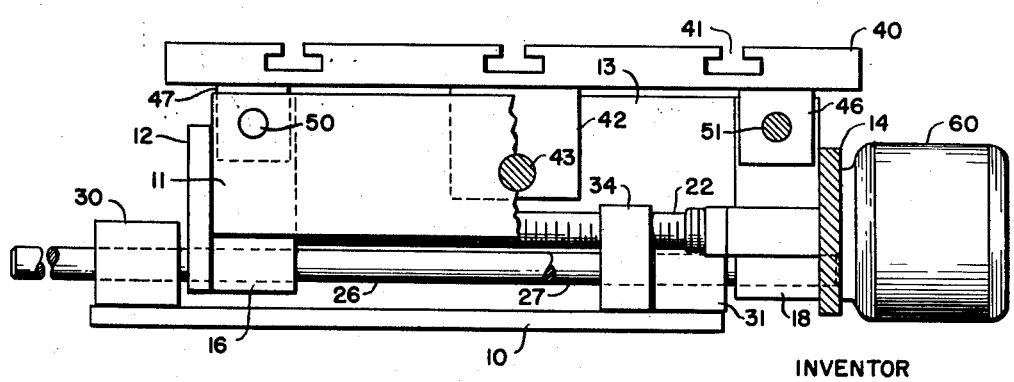
FIG. 3 is a cross section view taken along the lines 3—3 of FIG. 2 to show the relationship of the drive screws and the guide rods.

Referring now to FIG. 1, there is illustrated, according to the preferred embodiment of the invention, a positioning table 2 secured to a work table 1 of a vertical drill 6, the positioning table being independently movable to selected positions by its own X axis and Y axis drive motors 45 and 60. In many types of operations, for example, as with a drill press that previously was manually controlled and is now being adapted to be remotely controlled, it is advisable to secure to the usual work table 1 a separate table that is remotely positionable according to the electrical inputs to the drive means for the separate table to position the separate table relative to the tool.

The positioning table 2 has a flat base plate 10 to which is secured the remaining elements of the table and which provides a convenient means for readily securing the positioning table 2 to the usual work table of an existing machine by any of the conventional manners such as C clamps, the base plate 10 thus constitutes the fixed portion of the positioning table 2 relative to which the remaining elements of the positioning table 2 move. To eliminate the heavy castings and the expense required in machining these castings to form the usual V-shaped guide ways therein, the present positioning table has a modular construction in that it utilizes a plurality of identical blocks that can be readily machined in the same machining setup, thereby assuring saving costs of additional set up operations and assuring that the machine surfaces are all parallel to one another. Fixedly mounted upon the base plate 10 are a pair of spaced guide blocks 30 and 31 which are approximately square and have machined therein guide surfaces or apertures 32 closely dimensioned to receive and guide their respective parallel guide rods 26 and 27 of the Y axis positioning structure 7. The guide surfaces 32 are horizontal apertures extending completely through their guide blocks 30 and 31 and are of a sufficient length to prevent any lateral movement of the guide rods 26 and 27.

The Y axis positioning structure 7 is the subframe unit that realizes a greater accuracy and alignment of the elements of a positioning table 2 without costly machining than heretofore has been known in the art. The Y axis positioning structure has four vertical side plates 11, 12, 13 and 14 which are fastened together at their corners and which form a square of great accuracy because the Y axis guide rods 26, 27 and X axis guide rods 50 and 51 inserted through the holes 23 and 24 in the opposed side plates 11, 13 and 12, 14 hold them in parallel relationship. Because the opposed pairs of side plates 11, 13 and 12, 14 are made from the same machining setup and even can be made simultaneously merely by stacking the side plates one upon the other, the dimension between the spaced holes 23 and 24 will be identical and the accuracy of this dimension will hold their respective guide rods 26, 27 and 50, 51 spaced apart equal distances throughout their entire length, thereby assuring that the pair of rods 26, 27 and 50, 51 supported in opposed side plates 11, 13 and 12, 14 are in parallel relationship through their entire length. Therefore, when the side walls 11, 12, 13 and 14 are secured together by screws 19 at their respective corners, the resulting square or rectangle will have accurately aligned side walls without elaborate setups or machining operations. Moreover, due to the square corners between these secured side plates 11, 12, 13 and 14, the corner block members 15, 16, 17 and 18 place in each of the four corners of the secured side plates 11, 12, 13 and 14 need not have accurately machined outer surfaces to hold the side plates 11, 12, 13 and 14 to form square corners as the corners are already square. Accordingly, commercially available blocks can be used as the corner blocks 15, 16, 17 and 18.

In accordance with the objects of the invention, the corner blocks 15, 16, 17 and 18 are of substantially identical dimensions and their guide rod apertures 32 can be machined by the same machining setup. Near the bottom of the corner blocks 15, 16, 17 and 18 are machined horizontal apertures 32 extending parallel to the Y axis and into which are fastened the guide rods 26 and 27, the guide rods 26 and 27 align the corner blocks 15, 16, 17 and 18 in parallel lines with reference to the Y axis and add rigidity to Y axis positioning structure 7 as the guide rods 26 and 27 are fixed to the corner blocks 15, 16, 17 and 18, i.e. they do not slide within their apertures 32. These guide rods 26 and 27 are of sufficient length to span the distance between adjacent guide blocks along the Y axis and have a portion thereof extending outwardly from the frame unit to remain in guiding engagement within the guide blocks 30 and 31 even when the Y axis positioning structure is furthest removed from the shaft 5 of the drill 6.

Secured to the vertical side member 14 of the Y axis positioning structure 7 is a reversible Y axis driving motor 60 which reverses direction of rotation upon the change of electric input signals and thereby causes either clockwise or counterclockwise rotation of its shaft 61. The motor shaft 61 is connected by a flexible coupling 62 to a drive screw 22, which has one end held against axial movement by thrust bearings 63 and supported by a bracket member 20 secured to the side member 14 by spacers 21. The opposite end of the Y axis drive screw 22 is supported for rotational movement by side member 12. This Y axis drive screw 22 extends through and is in threaded engagement with a Y axis drive nut 34 fixedly mounted on the flat base 10. Thus, when the Y axis motor 60 is energized the Y axis drive screw 22 will be rotated and due to its threaded engagement with the Y axis drive nut, Y axis movement, plus or minus depending upon the rotation of the Y axis motor 60, will be imparted to the Y axis positioning structure 7 with the guide rods 26, and 27, sliding through guide blocks 30 and 31, thereby assuring aligned parallel movement of the Y axis positioning structure 7.

The X axis positioning structure 8 includes a work table 40 in which are formed suitable T slots 41 for securing a work piece thereto in the normal manner. Secured by suitable fasteners to the underside of the worktable 40 are four identical guide blocks 46, 47, 48 and 49 of the same dimensions as guide blocks 30 and 31 and which have machined therein holes 70 through which slide a pair of X axis guide rods 50 and 51. The X axis guide rods 50 and 51 are fastened within the upper apertures 32 formed in each of the corner block members 15, 16, 17 and 18 at right angles to the lower apertures and like the Y axis guide rods 30 and 31, the X axis guide rods 50 and 51 add rigidity to the Y axis positioning structure 7. It should be noted that two of the guide blocks 46 and 47 are positioned within the Y axis positioning structure and that the guide blocks 48 and 49 are positioned externally of the Y axis positioning structure, the movement of the worktable 40 in the X direction being limited only by abutment of the internal guide blocks 46 and 47 with their respective opposed corner blocks 15, 16, 17 and 18. In contrast thereto, if all of the guide blocks 46, 47, 48 and 49 were internal of the Y axis positioning structure 7, the movement of the worktable 40 would be less in the X direction by the distance extending between outside surfaces of the pairs of blocks 46, 47, 48 and 49.

Secured to the under surfaces of the worktable 40 and depending therefrom is the X axis drive nut 42 through which extends the X axis drive screw 43, which has one end held against axial movement by thrust bearings 80 in a bracket 65 that is secured to the vertical side member 11 by spacers 66. The other end of the drive screw 43 is supported for rotational movement by the vertical side member 18. A flexible coupling 44 interconnects the X axis drive motor 45 with the drive screw 43 to impart the rotation of the X axis drive motor shaft 39 to the drive screw 43. Rotation of the shaft 43 by the X axis drive motor 45 will impart plus or minus movement along the X axis to the work table 40 as it is guided for aligned parallel movement by the guide blocks 46, 47, 48 and 49 sliding along the guide rods 50 and 51 secured in the corner blocks 15, 16, 17 and 18.

Thus, it will be observed that when the Y axis motor 60 rotates its drive shaft 61 through the drive nut 34 fixed upon the base plate 10, the Y axis positioning structure 7 will move along the Y axis and that those portions of the Y axis guide rods 26 and 27 extending in cantilever fashion beyond the frame of the Y axis positioning structure will be sliding through the apertures 32 in the fixed guide blocks 30 and 31 on the base plate 10. Concurrently with rotation of the Y axis motor 60 and movement of the Y axis positioning structure 7, it is possible to energize the X axis motor 45 to rotate its drive shaft 39 through the drive nut 42 depending from the worktable 40 thereby moving the worktable 40 along the X axis and sliding the depending guide blocks 46, 47, 48 and 49 along the surface of the guide rods 50 and 51. Thus, the worktable 40 will be moving relative to base 10 and the machine tool or drill, simultaneously in both the X and Y directions. Therefore, instantaneous vector additions of these movements will show that circular or other non-linear movements of the table relative to the tool are possible.

The modular construction herein incorporated has the advantage of having only three units, viz, the base plate unit with the guide blocks 30, and 31, and Y axis drive nut 34, the Y axis positioning structure 7 carrying both the Y axis and X axis driving motors 60 and 45, and the worktable 40 having depending therefrom the guide blocks 46, 47, 48 and 49, thereby eliminating a fourth unit which would be X axis motor supporting unit. The eliminating of this extra unit allows a reduction in the height of the table as does the concept of positioning within the hollow interior of the Y axis positioning structure 7, the upwardly protruding Y axis drive nut 34 of the base unit, the depending X axis drive nut 42 and the spacer blocks 46 and 47.

Although only one embodiment of the invention is shown in the drawings and described in the foregoing specification it will be understood that invention is not limited to the specific embodiment described but is capable of modification and rearrangement and substitution of parts and elements without departing from the spirit of the invention.

What is claimed is:

1. A co-ordinately positionable worktable comprising a base section, a hollow-interiored intermediate section and a work-holding section, fixed guide blocks secured to said base section at spaced points and having aligned guiding surfaces, first guide rod means fixedly carried by said intermediate section and slidably engaging said aligned surfaces on said guide blocks, said first guide rod means adapted to span said hollow-interiored intermediate section and extend a predetermined distance therebeyond in cantilever fashion, a second guide rod means fixedly carried by said intermediate section and disposed orthogonally with respect to said first guide rod means, said second guide rod means adapted to also span said hollow-interiored intermediate section and extend a predetermined distance therebeyond in cantilever fashion, movable guide blocks slidably engaging said second guide rod means, said movable guide blocks secured to said work-holding section, a first drive nut fixed to said base section, a first driving means secured to said intermediate section and including a driving screw engaging said first drive nut, a second drive nut secured to said work-holding section, and a second driving means also secured to said intermediate section and including a drive screw means in threaded engagement with said second drive nut, whereby in response to activation of said first and second driving means co-ordinate positionment of said intermediate section and said work-holding section is facilitated.

2. A co-ordinately positionable worktable comprising a base, a work holder and an open-ended box-like member positioned therebetween, fixed guide blocks secured to said base at spaced points and having aligned guiding surfaces, first guide rod means carried by opposite sides of said box-like member and extending a predetermined distance beyond one of said sides in cantilever fashion, said first guide rod means slidably engaging said aligned surfaces in said guide blocks, a second guide rod means carried by other opposite sides of said box-like member and adapted to extend beyond one of said other sides in cantilever fashion, said second guide rod means disposed above and orthogonally with respect to said first guide rod means, movable guide block means slidably engaging said second guide rod means, said movable guide block means secured to said work holder, a first drive nut fixed to said base, a first driving means carried by said box-like member and including a driving screw engageable with first drive nut, a second drive nut secured to said work holder, and a second driving means also carried by said box-like structure and including a drive screw means engageable with said second drive nut, whereby in response to the activation of said first and second driving means co-ordinate positionment of said box-like section and said work holder is facilitated.

3. A co-ordinately positionable worktable comprising a base, a work holder and an open-ended box-like member positioned therebetween, fixed guide blocks secured to said base at spaced points and having aligned guiding surfaces, first guide rod means supported by opposite sides of said box-like member and extending a predetermined distance beyond one of said sides in cantilever fashion, said first guide rod means slidably engaging said aligned surfaces in said guide blocks, a second guide rod means supported by other opposite sides of said box-like member and adapted to extend a predetermined distance beyond one of said other sides in cantilever fashion, said second guide rod means disposed above and perpendicularly with respect to said first guide rod means, movable guide block means slidably engaging said second guide rod means, said movable guide block means secured to said work holder, a first drive nut fixed to said base, a first driving means comprising a reversible motor carried by said box-like member and including a driving screw engageable with said first drive nut, a second drive nut secured to said work holder, and a second driving means comprising a reversible motor also carried by said box-like structure and including a drive screw means engageable with said second drive nut, whereby in response to the selective activation of the reversible motors of said first and second driving means co-ordinate positionment of said box-like section and said work holder is facilitated.

4. A co-ordinately positionable worktable comprising a base section, an open-ended hollow-interiored intermediate section and a work-holding section, fixed guide blocks secured to said base section at spaced points and having aligned guiding bores therethrough, first guide rod means fixedly supported by said intermediate section and slidably engaging said aligned bores on said guide blocks, said first guide rod means adapted to span said hollow-interiored intermediate section and extend a predetermined distance therebeyond in cantilever fashion, a second guide rod means fixedly supported by said intermediate section and disposed orthogonally with respect to said first guide rod means in a parallel plane thereabove, said second guide rod means adapted to also span said hollow-interiored intermediate section and extend a predetermined distance therebyond in cantilever fashion, movable guide blocks slidably engaging said second guide rod means, said movable guide blocks secured to said work-holding section, a first drive nut fixed to said base section, a first driving means comprising a reversible motor secured to said intermediate section and including a driving screw engaging said first drive nut, a second drive nut secured to said work-holding section, and a second driving means comprising a reversible motor also secured to said intermediate section and including a drive screw means in threaded engagement with said second drive nut, whereby in response to the selective activation of the reversible motors of said first and second driving means co-ordinate positionment of said intermediate section and said work-holding section is facilitated.

5. A co-ordinately positionable worktable comprising a base section, a quadrilateral intermediate section and a work-holding section, fixed guide blocks secured to said base section at spaced points and having aligned bores therethrough, first guide rod means spanning the distance between opposite sides of said intermediate section and slidably engaging said aligned bores on said guide blocks, said first guide rods adapted to extend a predetermined distance beyond one of said sides in cantilever fashion, a second guide rod means spanning the distance between the other opposite sides of said intermediate section and extending a predetermined distance beyond one of said other sides in cantilever fashion, movable guide blocks slidably engaging said second guide rod means, said movable guide blocks secured to said work holding section, a first drive nut fixed to said base section, a first driving means comprising a reversible motor secured to said intermediate section and including a driving screw engaging said first drive nut, a second drive nut secured to said work-holding section, and a second driving means comprising a reversible motor also secured to said intermediate section and including a drive screw means in threaded engagement with said second drive nut, whereby in response to the selective activation of the reversible motors of said first and said second driving means co-ordinate positionment of said intermediate section and said work-holding sections is facilitated.

6. A co-ordinately positionable worktable comprising a base section, an intermediate section and a work-holding section, first interrelated guiding facilities carried by said base section and said intermediate section, second interrelated guiding facilities carried by said work-holding section and said intermediate section, said first and second guiding facilities disposed orthogonally and in parallel planes, each of said guiding facilities having a corresponding portion thereof extending a predetermined distance beyond said intermediate section in cantilever fashion, a first driving means comprising a reversible motor secured to said intermediate section and including a driving screw engaging a threaded instrumentality attached to said base section, and a second driving means comprising a reversible motor also secured to said intermediate section and including a driving screw engaging a threaded instrumentality attached to said work-holding section, whereby in response to the selective activation of the reversible motors of said first and said second driving means co-ordinate positionment of said intermediate section and said work-holding section is facilitated.

7. A positionable worktable comprising a base section, an intermediate section and a work-holding section, first interrelated guiding facilities carried by said base section and said intermediate section, second interrelated guiding facilities carried by said work-holding section and said intermediate section, said first and second guiding facilities disposed orthogonally and in parallel planes, each of said guiding facilities having a corresponding portion thereof extending a predetermined distance beyond said intermediate section in cantilever fashion, a first driving means secured to said intermediate section and including a threaded element engaging a threaded instrumentality attached to said base section, and a second driving means also secured to said intermediate section and including a threaded element engaging a threaded instrumentality attached to said work-holding section, whereby in response to the selective activation of said first and said second driving means selective positionment of said intermediate section and said work-holding section is facilitated.

8. A selectively positionable worktable comprising a first part, a second part and a third part, first interrelated guiding facilities carried by said first part and said second part, second interrelated guiding facilities carried by said third part and said second part, said first and second guiding facilities disposed substantially orthogonally and in parallel planes, each of said guiding facilities having a corresponding portion thereof extending a predetermined distance beyond said second part in cantilever fashion, a first driving means mounted in said second part and including a threaded element engaging a threaded instrumentality attached to said first part, and a second driving means also mounted in said second part and including a threaded element engaging a threaded instrumentality attached to said third part, whereby in response to the selective activation of said first and second driving means selective positionment of said second and third parts is facilitated.

9. A selectively positionable worktable comprising a first part, a second part and a third part, first interrelated guiding facilities carried by said first part and said second part, second interrelated guiding facilities carried by said third part and said second part, said first and second guiding facilities disposed substantially orthogonally and in parallel planes, each of said guiding facilities having a corresponding portion thereof extending a predetermined distance beyond said second part in cantilever fashion, a first actuating means mounted in said second part and including an element co-actively engaging an instrumentality attached to said first part, and a second actuating means also mounted in said second part and including an element co-actively engaging an instrumentality attached to said third part, whereby in response to the selective activation of said first and second actuating means selective positionment of said second and third parts is facilitated.

References Cited in the file of this patent

UNITED STATES PATENTS

| | | |
|---|---|---|
| 2,838,967 | Meyer | June 17, 1958 |
| 2,957,362 | Kelm | Oct. 25, 1960 |